June 8, 1926. 1,588,008
R. S. BURDETTE
METHOD OF FORMING CUSHION TIRES
Filed Nov. 22, 1923
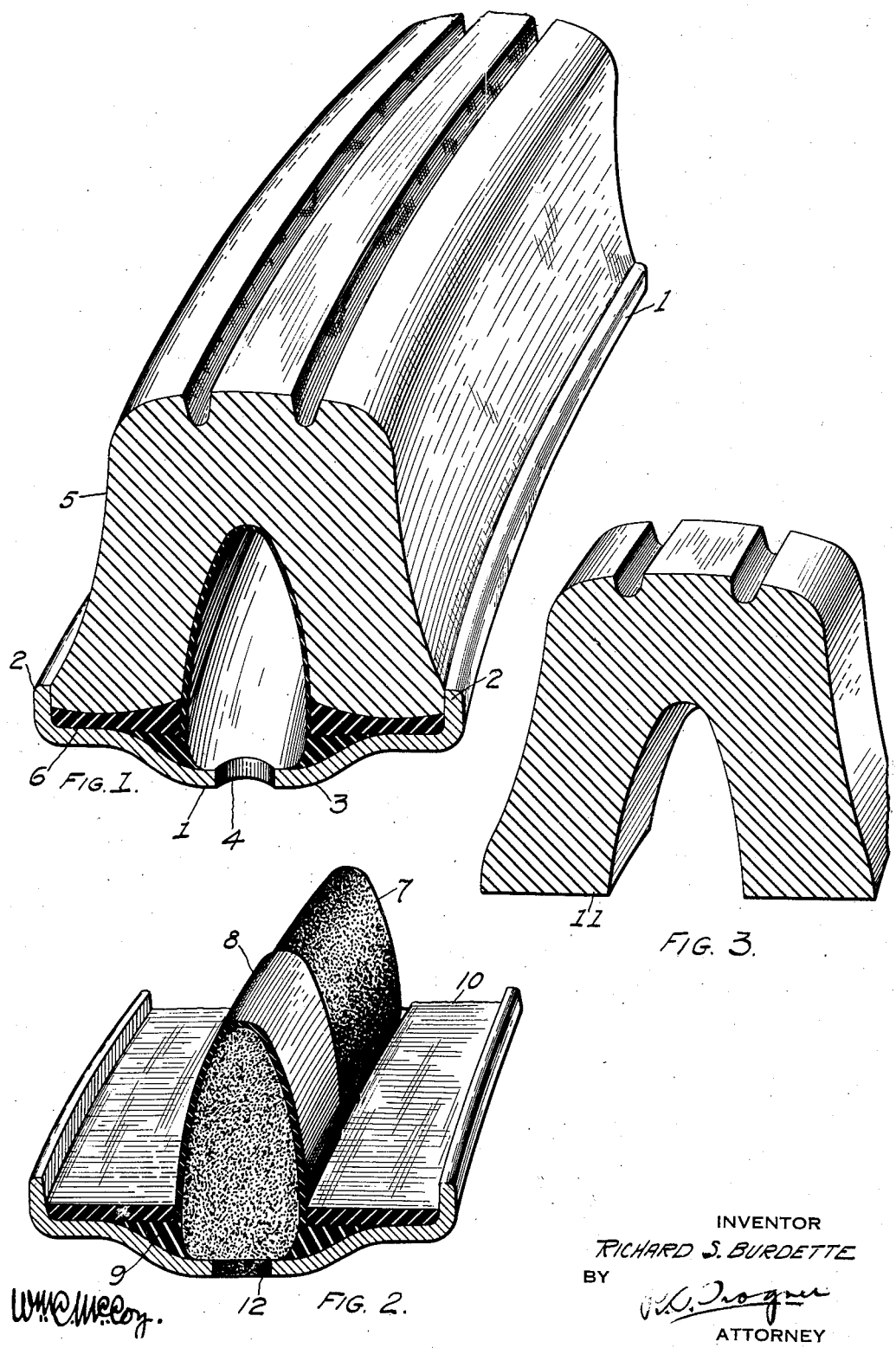
INVENTOR
RICHARD S. BURDETTE
BY
ATTORNEY Patented June 8, 1926.

1,588,008

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

METHOD OF FORMING CUSHION TIRES.

Application filed November 22, 1923. Serial No. 676,281.

My invention relates to cushion vehicle tires and methods of their manufacture and it particularly contemplates an improvement in the method of manufacture and in the construction of the vehicle tire described in my copending application Serial Number 656,641, filed August 10, 1923.

Tires of this general type have previously been formed on base bands of hot rolled section having a central peripheral channel adapted to closely fit the sand core used in the construction of the tire as indicated in my above designated application, or embodying the conventional base band constructed of three separate parts. In each of these types of tires it was believed necessary to first electrolytically plate the rim surface with copper and then apply a plating of brass to the surface upon which the cushion rubber of the tire was to be mounted. Tires embodying base bands of hot rolled section have also required adapter rings when they are mounted on vehicle rims primarily constructed for pneumatic tires.

The present invention contemplates a cushion tire embodying a single piece base band of uniform thickness that may be mounted on the conventional form of felloe band without the use of an adapter ring and that embodies an internal cavity adapted to give greater cooling and cushioning effect than has heretofore been obtainable in cushion tires of this size, and it also embodies a base band of greatly reduced weight. The reduced cost of construction, the reduced weight, and the greatly improved ability of the base band to dissipate heat developed within the tire are inherent advantages. Tires constructed in accordance with this invention may also omit the conventional hard rubber composition that is used adjacent the base band, thus providing more active rubber to resist road impacts.

Other objects and advantages to be derived from practicing my invention will be apparent from a perusal of the accompanying specification and drawings in which:

Fig. 1 is a lateral sectional view of a tire constructed in accordance with my invention;

Fig. 2 is a lateral sectional view of a portion of a tire shown in the process of construction; and Fig. 3 is a lateral sectional view of a portion of the cushion rubber prior to its incorporation in the tire.

The tire shown in the drawing comprises a single piece base band 1 of uniform thickness having upstanding edge portions 2, and an intermediate depressed portion 3 which provides the conventional frustoconical seating surface for mounting the tire on a wheel felloe. The depressed portion 3 of the base band has a series of holes 4 through which the core that is used in the manufacture of the tire is removed and which also function to ventilate the interior cavity of the tire.

A cushion body 5 of conventional form is mounted on the base band 1 and vulcanized thereto through the agency of layers 6 of rubber compound that have a relatively high affinity for brass plated surfaces and that readily vulcanize thereto.

The base band 1 upon which the cushion tire is built is preferably a cold rolled steel section of uniform thickness and of relatively light weight. The reduction in the weight of the base band greatly improves the operating qualities of the tire. The peripheral face of the base band is carefully cleaned and plated with a thin coating of brass. This differs from the conventional practice in that it has heretofore been deemed necessary to electrolytically deposit a coating of copper on the base band before the brass plating is applied. Repeated experiments demonstrate that a coating of copper is unnecessary, and that a much thinner coating of brass may be used if the intermediate copper plate is omitted.

The peripheral face of the base band is then treated with rubber cement that preferably contains a high percentage of zinc oxide. Core members 7 are mounted in the depressed portion of the base band and held in place by a relatively thin rubber band 8 that extends circumferentially around the base band.

The sectional sand core 7 is preferably constructed in accordance with my co-pending application Serial Number 644,477, filed June 9, 1923, from sand that is held together by a soluble and heat resistant binder.

Strips 9 of rubber compound, that preferably contains a high percentage of zinc, are next inserted in the depressed portion of the base band on each side of the core 7 in order to firmly hold the same in place. Additional strips 10 are applied over the strips 9 and the remaining exposed surface of the base band. These strips 10 can also be formed as a part of the rubber cushion body 11 of the tire and mounted on the base band when the rubber cushion body 11 is placed thereon.

The rubber cushion body 11 is of extruded rubber compound adapted to be mounted directly over the core member 7, and to engage the base band on each side of the core. As previously mentioned one of the strips 10 may be formed as a part of each leg of the cushion body 11 if desired.

Plugs 12 of plaster of Paris, putty, or other heat and water resisting material, may be used to seal the holes 4 in order to exclude moisture from the tire cavity during the process of vulcanization.

The assembled tire is next confined in a mold and vulcanized under heat and pressure to the form shown in Fig. 1. After vulcanization the plugs 12 are destroyed and jets of water are introduced through the holes 4 to remove the soluble core 7.

A tire constructed in accordance with this invention has certain inherent advantages which are not present in tires of conventional form. The use of live rubber between the cushion body and the base band and the relatively deep cavity that is formed in the tire, by depressing a portion of the base band, increase the cooling capacity of the tire cavity and also increase the shock absorbing capacity of the side walls of the cushion body, as will be apparent from a study of the cross sectional form of the tire.

The depressed portion of the base band also provides bearing faces for mounting the tire upon the conventional form of felloe that is used for pneumatic tires without the conventional adapters commonly demanded for mounting small sized cushion tires and also utilizes the valuable space between the felloe band and the cushion body of the tire for cooling and cushioning purposes.

I desire that only such limitations shall be imposed upon the spirit and scope of my invention as are indicated in the accompanying claims.

What I claim is:

1. The method of forming a cushion tire that comprises mounting a non-deformable water soluble and heat resistant core on a base band having a treated surface adapted to unite with the rubber stock, disposing a strip of rubber compound on each side of said core to prevent lateral displacement thereof, applying the cushion body of the tire, vulcanizing said tire, and removing said core.

2. The method of forming a cushion tire that comprises electrolytically depositing a thin coating of brass directly upon an iron base band, painting the face of the plated base band with a cement having a high percentage of zinc oxide therein, mounting a non-deformable soluble core intermediate the sides of said base band, applying a strip of rubber compound to said base band on each side of said core, applying the cushion body of the tire to said base band, vulcanizing said assembly, and removing said core.

3. The method of forming a cushion tire that comprises electrolytically depositing a thin coating of brass directly upon the surface of an iron base band, applying a coating of cement containing a high percentage of zinc oxide to the plated surface, applying a rubber cushion tire body thereto, and vulcanizing said assembly.

4. A method of forming cushion tires that comprises depositing a thin coating of brass directly upon the surface of an iron base band having upstanding edge portions, applying a coating of cement containing a high percentage of zinc oxide to the plated surface, mounting a soluble core of the shape of the desired cavity intermediate the edge portions, applying a strip of rubber to the base band on each side of the core and applying a rubber cushion body over the core; vulcanizing the assembly under heat and pressure and removing the core.

5. The method of forming a cushion tire that comprises mounting a core of the shape of the cavity desired and of soluble material on a base band, applying a strip of rubber compound to each side of said core to prevent lateral displacement thereof, applying a thread body to said assembly, vulcanizing said assembly, and removing said core.

6. The method of constructing a cushion tire that comprises electrolytically depositing a very thin coat of brass directly upon the iron surface of a base band having upstanding edge portions, a depressed central portion, and intermediate frusto-conical bearing shoulders; painting the outer surface of the base band with rubber cement having a high percentage of zinc oxide; mounting a sand core having a water soluble and heat resisting binder on the rim; holding said core in place by means of a rubber band extending circumferentially therearound; applying a relatively narrow strip of rubber compound incorporating a high percentage of zinc oxide to the rim on each side of the core; applying a second strip of rubber compound to the rim on each side of the core of sufficient width to extend from the core to the upstanding edge portions; applying a rubber cushing body, and vulcanizing the assembly in a mold under heat and pressure.

In witness whereof, I have hereunto signed my name.

RICHARD S. BURDETTE.